United States Patent
Hefazi

(10) Patent No.: US 12,524,828 B2
(45) Date of Patent: Jan. 13, 2026

(54) SYSTEM, METHOD AND DATA STRUCTURE FOR MAPPING 3D OBJECTS TO 2D SHADED CONTOUR RENDERINGS

(71) Applicant: Broken Lines LLC, San Diego, CA (US)

(72) Inventor: Siamak Saidi Hefazi, San Diego, CA (US)

(73) Assignee: Broken Lines, LLC, San Diego, CA (US)

( * ) Notice: Subject to any disclaimer, the term of this patent is extended or adjusted under 35 U.S.C. 154(b) by 0 days.

(21) Appl. No.: 19/244,757

(22) Filed: Jun. 20, 2025

(65) Prior Publication Data

US 2025/0315915 A1    Oct. 9, 2025

Related U.S. Application Data

(63) Continuation of application No. 18/666,698, filed on May 16, 2024.

(60) Provisional application No. 63/502,416, filed on May 16, 2023.

(51) Int. Cl.
   *G06T 3/067* (2024.01)
   *G06T 17/00* (2006.01)
   *G06V 10/44* (2022.01)

(52) U.S. Cl.
   CPC ............. *G06T 3/067* (2024.01); *G06T 17/00* (2013.01); *G06V 10/44* (2022.01)

(58) Field of Classification Search
   CPC .......... G06T 3/067; G06T 17/00; G06V 10/44
   See application file for complete search history.

(56) References Cited

U.S. PATENT DOCUMENTS

| | | | | |
|---|---|---|---|---|
| 6,678,119 B1* | 1/2004 | Pendray | ............... | G11B 5/6005 360/235.8 |
| 2006/0290695 A1* | 12/2006 | Salomie | ................. | G06T 17/20 345/423 |
| 2012/0036424 A1* | 2/2012 | Prast | ....................... | G06F 30/00 715/234 |
| 2017/0161590 A1* | 6/2017 | Boulkenafed | ..... | G06F 18/24143 |

(Continued)

OTHER PUBLICATIONS

OLav3d, "Blender Tutorial: 3D Landscapes to 2D Contour Plot", Youtube video, Published on Jan. 10, 2023. https://www.youtube.com/watch?v=c2XitoHmps0 (Year: 2023).*

*Primary Examiner* — Sing-Wai Wu
(74) *Attorney, Agent, or Firm* — US IP Counsel, APC; Siamak S. Hefazi

(57) ABSTRACT

The embodiments describe herein relate to a system for real-time transformation of 3D models to 2D shaded contour renderings. The system comprises a processor in communication with a memory. The memory storing executable instructions that when executed by the processor configure the system for receiving, a 3D model input corresponding to a physical object, and generating, based on the 3D model input, a data structure including one or more features of the physical object, and one or more 2D renderings of the physical object. The processor further configures the system for correlating, the one or more features with the one or more 2D renderings of the physical object and determining, based on the one or more features, a 2D shaded contour rendering of the physical object. The system is configured for transmitting, to a display device the 2D shaded contour rendering of the physical object.

20 Claims, 10 Drawing Sheets

(56) References Cited

U.S. PATENT DOCUMENTS

2018/0204314 A1\* 7/2018 Kaplanyan ................ G06T 5/60
2021/0158096 A1\* 5/2021 Sinha ..................... G06N 3/045

\* cited by examiner

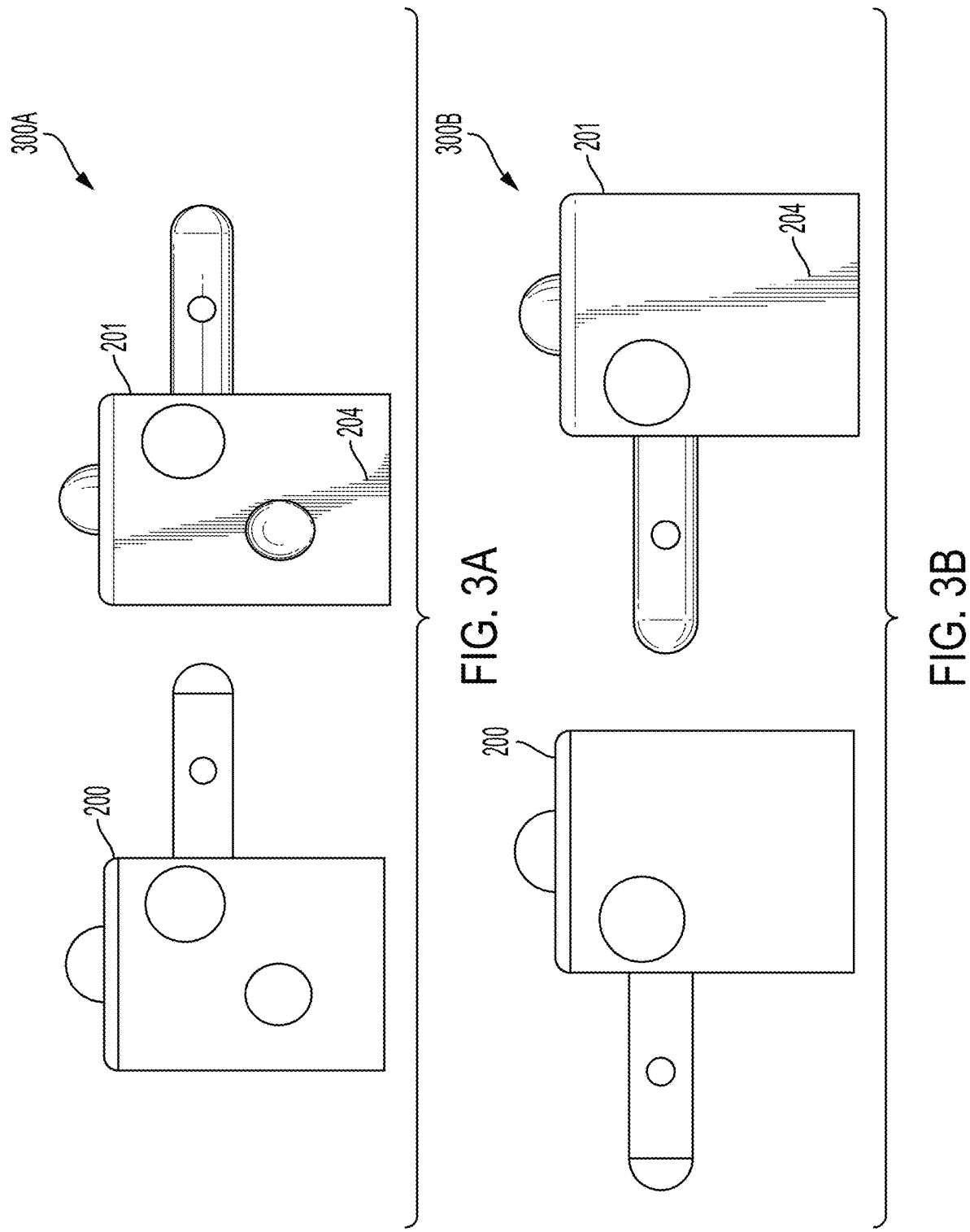

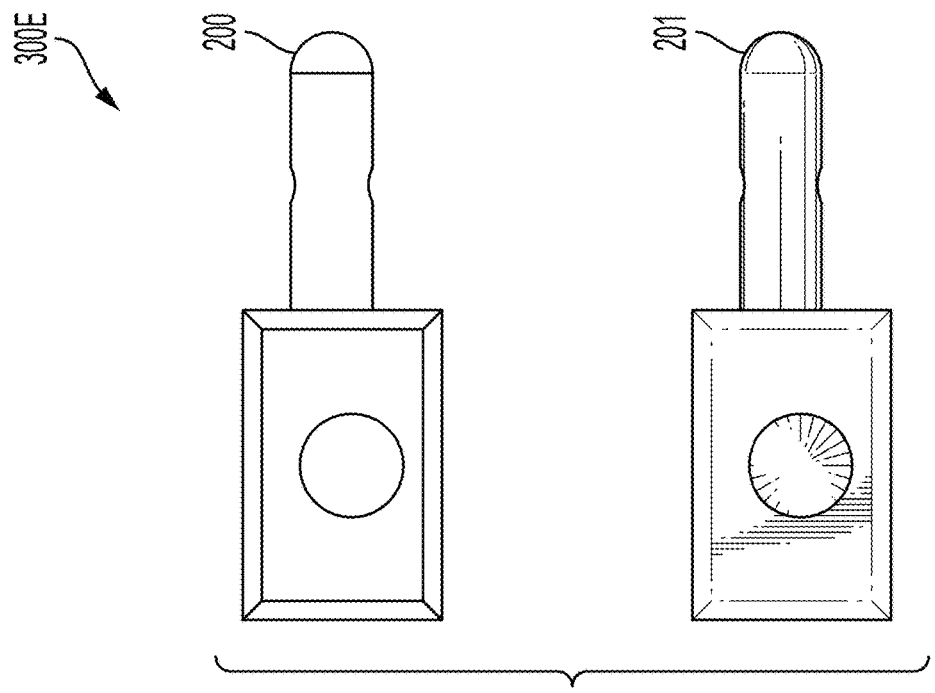
FIG. 3E
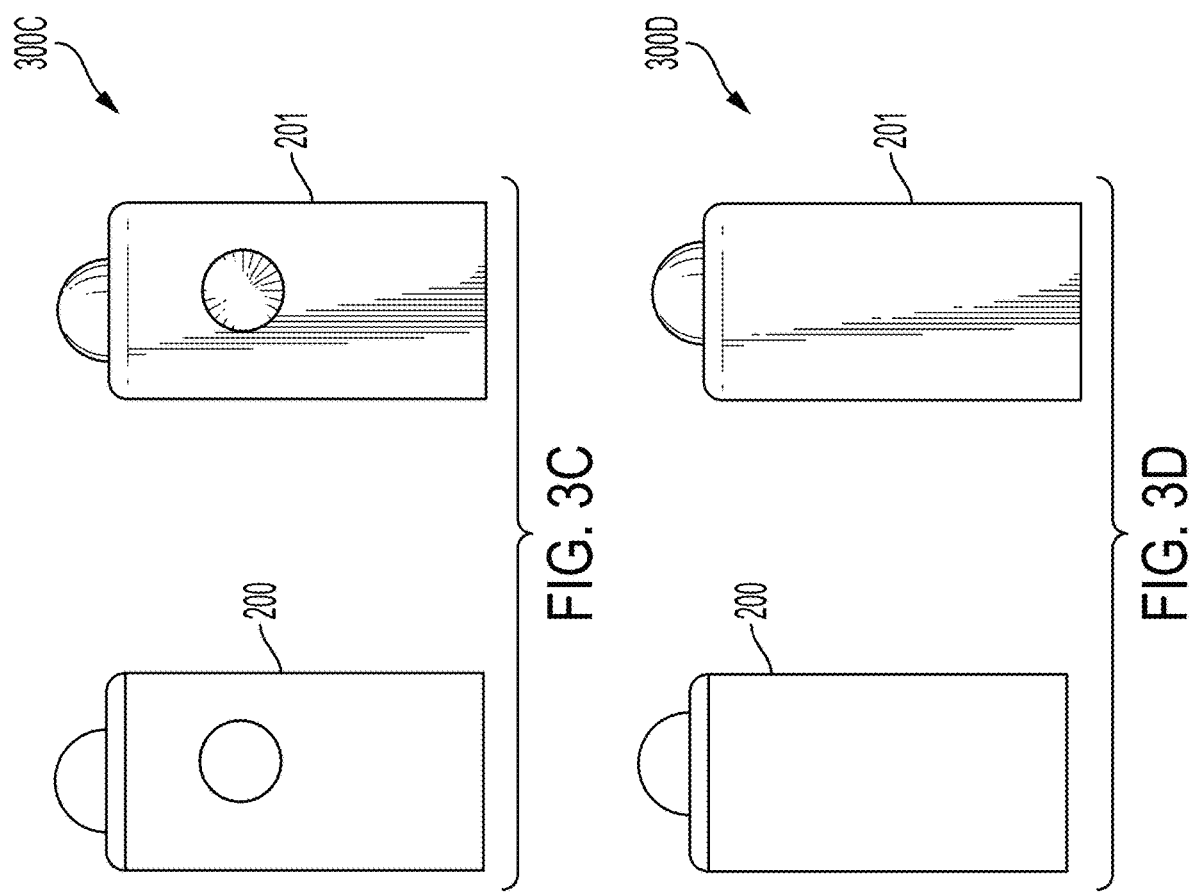
FIG. 3C
FIG. 3D

SYSTEM, METHOD AND DATA STRUCTURE FOR MAPPING 3D OBJECTS TO 2D SHADED CONTOUR RENDERINGS

CROSS-REFERENCE TO RELATED APPLICATIONS

This application is a continuation of U.S. patent application Ser. No. 18/666,698, filed May 16, 2024, which claims priority under 35 U.S.C. § 119(e) from provisional U.S. patent application No. 63/502,416, filed May 16, 2023, the contents of which are incorporated herein by reference.

BACKGROUND

Contour and surface shading renderings are a fundamental component of product design documentation, required to clearly demonstrate the features of a design in a format that adheres to industry and manufacturing standards. Current methods of creating contour and surface shading renderings are fraught with challenges. Manual drafting is not only time-consuming but also prone to human error, leading to potential inconsistencies in the interpretation of complex computer-aided design (CAD) models. Some algorithmic approaches are not accurate and do not provide predictable outcomes. Such approaches demand significant investment of time and resources, making it a costly affair for entities engaging in frequent renderings.

SUMMARY

Accordingly, some embodiments include a system for real-time transformation of 3D models to 2D shaded contour renderings. The system includes a processor in communication with a memory. The memory storing executable instructions that when executed by the processor configure the system for receiving, a 3D model input corresponding to a physical object. In some embodiments the system is configured for generating, based on the 3D model input, a data structure including one or more features of the physical object, and one or more 2D renderings of the physical object. In some embodiments, the system correlates, the one or more features with the one or more 2D renderings of the physical object, and determines, based on the one or more features, a shaded contour rendering of the physical object. The system is configured for transmitting, to a display device, the shaded contour rendering of the physical object.

Some embodiments include a computer-implemented method including receiving a three-dimensional model of a physical object and determining, based on the three-dimensional model, one or more two dimensional views of the physical object. In some embodiments the method includes correlating one or more feature vectors of the three-dimensional object with the one or more two dimensional views and outputting a data structure including the on the one or more features. In some embodiments, the method includes training a first predictive model utilizing the data structure, and training a second predictive model utilizing the data structure. In some embodiments, the method includes generating a predictive rendering, utilizing the data structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is noted, however, that the appended drawings illustrate only some aspects of this disclosure and the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

FIGS. 3A-3G illustrates schematics of a 3D object correlated to 2D views, in accordance with some embodiments;

DETAILED DESCRIPTION

Figure 1:
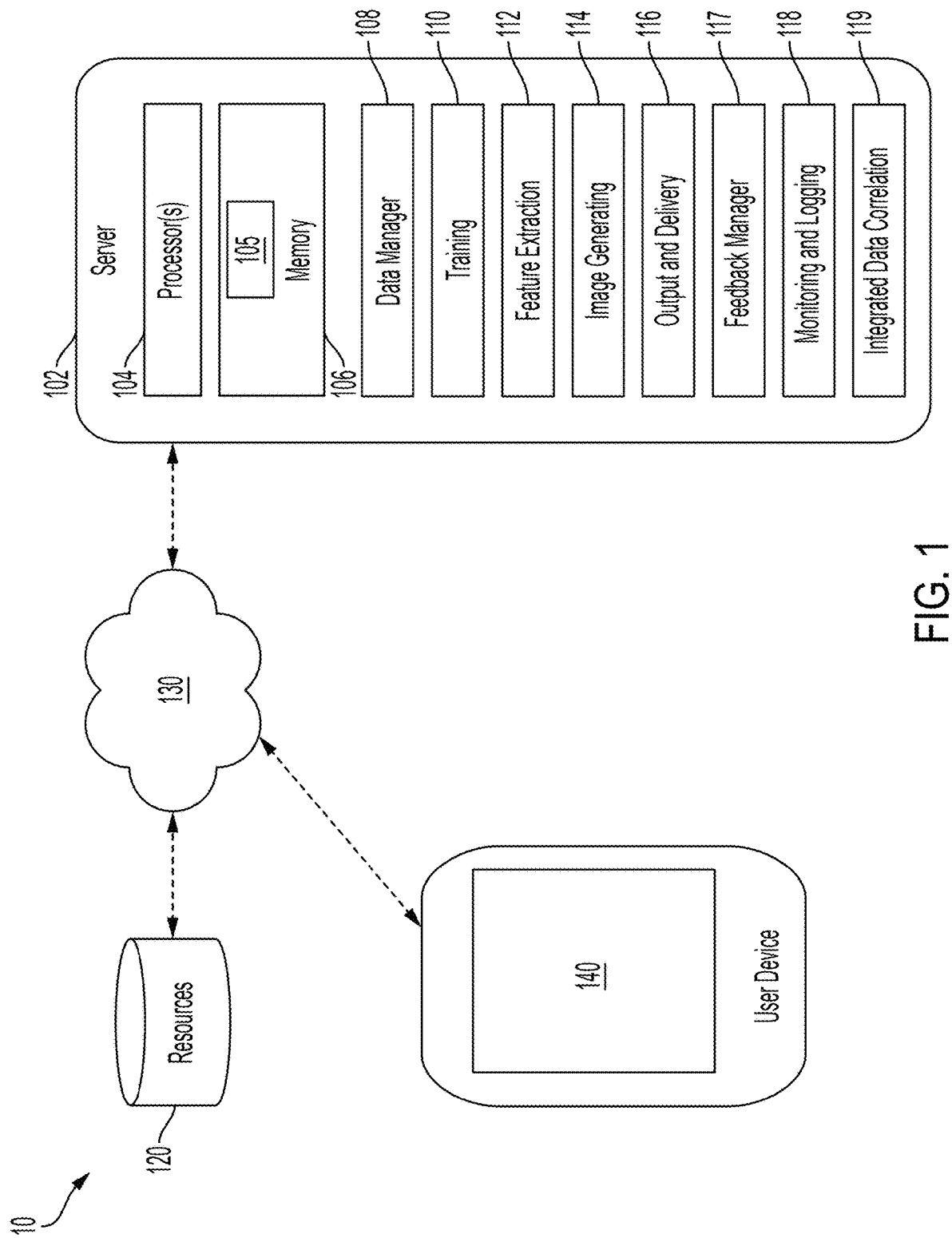
FIG. 1 illustrates a schematic of a system for mapping 3D objects to shaded contour renderings, in accordance with some embodiments.

The present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure.

As used herein, the singular form of "a", "an", and "the" include plural references unless the context clearly dictates otherwise. As used herein, the statement that two or more parts or components are "coupled" shall mean that the parts are joined or operate together either directly or indirectly (i.e., through one or more intermediate parts or components, so long as a link occurs). As used herein, "directly coupled" means that two elements are directly in contact with each other. As used herein, "fixedly coupled" or "fixed" means that two components are coupled so as to move as one while maintaining a constant orientation relative to each other. As used herein, "operatively coupled" means that two elements are coupled in such a way that the two elements function together. It is to be understood that two elements "operatively coupled" does not require a direct connection or a permanent connection between them. As utilized herein, "substantially" means that any difference is negligible, or that such differences are within an operating tolerance that are known to persons of ordinary skill in the art and provide for the desired performance and outcomes as described in one or more embodiments herein. Descriptions of numerical ranges are endpoints inclusive.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality). Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Embodiments described as being implemented in hardware should not be limited thereto, but can include embodiments implemented in software, or combinations of software and hardware, and vice-versa, as will be apparent to those skilled in the art, unless otherwise specified herein. In the exemplary embodiments described herein, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The embodiments described herein relate generally to real time renderings of 3D objects via neural networks and predictive models to produce 2D contour and surface shading renderings (i.e., shaded contour), systems, components thereof, and methods of use thereof. For example, rendering that show contour features by way of surface shading are an integral part of many industrial application in design and manufacturing. For example, for injection molded manufacturing, such products are rendered in three dimensions (3D), via a CAD program. However, when shown in 2D, such renderings lose depth and contour information. Accordingly, the embodiments herein leverage Computer-aided design (CAD) and artificial intelligence (AI), by employing machine learning (ML) models to predict the transformation of CAD models into 2D renderings that include contour and surface shading renderings in real time over a network such as the Internet.

Accordingly, some embodiments herein provide a system, method and data structure for an AI-powered solution designed to address these and other inefficiencies. By integrating advanced neural networks, including Convolutional Neural Networks (CNNs), U-Nets, and Generative Adversarial Networks (GANs), the embodiments herein provide real time conversion of 3D CAD models into 2D contour and surface shading renderings. The AI-driven approach of the embodiments herein ensures high accuracy and consistency, significantly reduces the time and cost associated with manual rendering, and minimizes or eliminates error. In some embodiments, the AI model of the embodiments herein is trained on a dataset of CAD models and corresponding contour and surface shading renderings, enabling the predictive model to learn and replicate the necessary stylistic and regulatory requirements in real time over a communication network. As a result, the embodiments herein offer a scalable, efficient, and labor-free alternative to the other methods of preparing contour and surface shading renderings, thereby enhancing productivity and reducing operational costs.

Referring now to FIG. 1, FIG. 1 illustrates the practical application in a networked setting of an exemplary System for Mapping Three-dimensional (3D) objects to 2D shaded contour renderings 10 (hereinafter "system 10"). As shown in FIG. 1, in some embodiments, system 10 may include server 102, resources 120, and user device 140 having GUI 142. In some embodiments, user device 140 may include a smart phone, laptop, desktop, and/or any computing device that functions as endpoints for users, such as engineers or illustrators, who interact with system 10. User device 140 facilities users uploading input 3D CAD models and downloading the output generated 2D shaded contour renderings, which may be displayed on GUI 142. As shown in FIG. 1, server 102, resources 120 and user device 140 may be in communication with one another via network 130. System 10 architecture is configured to handle the processing of 3D CAD models of physical objects into 2D shaded contour renderings, which is discussed in detail below.

In some embodiments, server 102 includes processor 104 in communication with memory 106. Memory 106 may include software code 105. Processor 104 is configured to receive and execute software code 105 for implementing one or more of the embodiments described herein. For example, server 102 may execute code 105 and cause system 10 to output a predictive rendering of a 2D shaded contour rendering, based on an input 3D CAD model file. Such output may be transmitted to a remote client or user, in real time, via network 130. In some embodiments, server 102 includes one or more modules for carrying out corresponding functions of the embodiments described herein. For example, in some embodiments, server 102 includes data manager 108, training 110, feature extraction 112, image generating 114, output and delivery 116, monitoring and logging 118, and/or integrated data correlation 119, which are described in further detail below.

In some embodiments, server 102 may communicate to external resources 120 via network 130. In some embodiments, network 130 may include, for example, a LAN/WAN connection configured to provide an Internet connection via a hybrid fiber optic (HFC) transmission network, (e.g., Ethernet twisted shielded pair CAT-5, WiFi, premises coaxial cable network, or any other connection capable of establishing an Internet connection). In some embodiments, network 130 may include a wireless network capable of establishing an internet connection (e.g., 5G, LTE, 4G, CDMA, and the like). Network 130 facilitates leveraging external resources 120 for facilitating various functionality, which is described in further detail below.

In some embodiments, external resources 120 may include a remote database and/or access to $3^{rd}$ party API services that facilitates the integration and interaction between system server 102, and a remote client at user device 140, with external systems and resources for enhanced functionality. For example, resources 120 may facilitate connection with a variety of 3rd party API services, enabling the system to leverage external tools and data sources. Such API services could include, but are not limited to, platforms offering advanced AI processing capabilities and predictive analytics tools, which is described in further detail below. In some embodiments, external resources 120 may establish connections with one or more remote databases (not shown), which may be advantageous in augmenting system 10 data handling and processing capabilities. By implementing external resources 120, system 10 may advantageously expand the range of functionalities, such as real-time data analysis, machine learning processes, and sophisticated predictive modeling, which is discussed in further detail below. Such external resources 120 not only enriches the user experience by providing more accurate and efficient outcomes but also enhances the overall system's performance by integrating virtualization techniques for streamlining process efficiency, which is described in detail further below.

One or more components of system 10 (e.g., device 140, processors 104, and/or modules 108, 110, 112, 114, 116, 118, 119) may be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs (e.g. code 105) that are executable and/or interpretable on a programmable system including one or more programmable processor(s) (e.g. 104), which can be special or general purpose, coupled to receive data and instructions from, and to transmit data and instructions to, a storage system (e.g., memory 106), at least one input device, and at least one output device. The programmable system or computing system may include clients (e.g., user device 140) and servers (e.g., 102). A client and server are generally remote from each other and typically interact through a communication network (e.g., 130). The relationship of client and server arises by virtue of computer programs running on the respective computers and having a client-server relationship to each other.

Such computer programs, which can also be referred to programs, software, software applications, applications, components, or code, include non-transitory machine-readable instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In some embodiments, server 102 may include data manager 108, training 110, feature extraction 112, image generating 114, output and delivery 116, monitoring and logging 118, and/or integrated data correlation 119. As described in further detail below, such modules 108-119 function alone and/or in coordination with one another for implementing the embodiments described herein. In the embodiments described herein, functions described as carried out by one module, may, in other embodiments, be carried out be a different module, or split among various modules. For example, functions described as performed by data manager 108 in one embodiment, may, in another embodiment, be performed by integrated data correlation 119 and/or monitoring and logging 118, and/or vice versa.

In some embodiments, data manager 108, manages data-related operations, including the ingestion, storage, and preprocessing of CAD files and shaded contour renderings. Data manager 108 ensures data integrity and efficient access to and from storage solutions. In some embodiments, Data Manager 108 manages data-related operations within system 10. For example, by the ingestion, secure storage, and systematic preprocessing of CAD files as well as the detailed shaded contour renderings.

In some embodiments, data manager 108 processes the intake of new CAD files, ensuring such input files are correctly formatted and free from errors. In some embodiments, intake processes (i.e., preprocesses) may include validating the data structure of incoming files against system 10 requirements and conducting initial checks for data completeness and integrity.

In some embodiments, leveraging integrated CNN/U-Net architecture, discussed further below, data manager 108 preprocesses the CAD files to extract features necessary for subsequent image generation. Such preprocessing includes applying morphological operations to enhance feature visibility and preparing data for efficient feature extraction and segmentation by feature extraction 112.

In some embodiments, data manager 108 organizes data storage, ensuring that both raw and preprocessed data are stored in a structured manner that facilitates quick retrieval. Such organization may be achieved using optimized data indexing and partitioning strategies that enhance the performance of data queries and reduce latency in data access. Ensuring the security and integrity of data throughout its lifecycle, Data manager 108 implements robust encryption methods for data at rest and in transit. Data manager 108 may also maintains data integrity checks to prevent and correct any data corruption or loss.

In some embodiments, data manager 108 works in close coordination with the feature extraction 112, image generating 114, and output and delivery 116 modules. Data manager 108 ensures that the flow of data across these modules is seamless and that the data format and structure are consistently maintained to support the end-to-end process of generating 2D shaded contour renderings. Such integration is advantageous for maintaining high efficiency and accuracy in the generation of detailed and standardized 2D shaded contour renderings. In one embodiment, data manger 108 may optimizes the retrieval processes to ensure that data access is swift and does not become a bottleneck, for example, when handling large volumes of high-resolution CAD models and their corresponding illustrations.

In some embodiments, training module 110 manages the training of machine learning models utilizing historical data to effectively learn the creation of shaded contour renderings. Training module 110, advantageously, continually refines the models' accuracy and processing efficiency. Training module 110 employs sophisticated training algorithms and cross-validation techniques to optimize model parameters and prevent overfitting. Regular updates and re-training cycles ensure that the models adapt to new types of CAD designs and evolving illustration standards, thereby enhancing system 10's adaptability and long-term performance.

In some embodiments, feature extraction 112 extracts essential feature vectors from CAD models that are necessary for generating precise shaded contour renderings. This process involves sophisticated algorithms designed to accurately identify and delineate edges, textures, and geometric features for detailed rendering. Advanced image processing techniques such as edge detection, texture analysis, and morphological transformations are utilized to enhance feature visibility and differentiation, which are advantageous for the subsequent stages of image generation.

In some embodiments, image generating 114 utilizes the trained models to transform the processed CAD data into high-quality shaded counter renderings. Image generating module 114 integrates artificial intelligence techniques, including GANs, to synthesize images. Through iterative refinement and learning, image generating module 114 continuously improves its capability to produce outputs that accurately represent the intended design attributes and specifications of the original CAD models.

In some embodiments, output and delivery module 116 is responsible for the final stages, where the shaded contour renderings are formatted and delivered to user's device 140. Output and delivery module ensures that each image is rendered in the correct format, adheres to the precise specifications required for industry submissions, and maintains the highest quality standards. Output and delivery module also manages the distribution channels, ensuring secure and efficient delivery of illustration rendering to user device 140, while supporting various output formats and user-specific customization options.

In some embodiments, monitoring and logging 118 oversees the system's performance and operational integrity of system 10 by continuously monitoring and recording system 10 activities. Monitoring and logging 118 is advantageous for proactive troubleshooting, performance optimization, and maintaining the reliability of the system 10. For example, by collecting and analyzing log data to detect anomalies, predict potential system failures, and initiate preventive measures. The insights gained from this data are advantageous for ongoing system maintenance, audits, and compliance with technical and regulatory standards.

In some embodiments, integrated data correlation (IDC) 119 serves as the central point for integrating the 3D CAD data with the 2D views and depth maps. This ensures that parts of the system access the same unified data format, maintaining consistency across processes. In some embodiments IDC 119, via normalization and standardization, manage data preprocessing to standardize the format and scale of the 3D and 2D data, ensuring that inputs to machine learning models are consistent and optimized for performance.

In some embodiments, IDC 119 facilities data caching by implementing caching mechanisms to store processed data, reducing redundancy in data processing across different modules (e.g., 108, 110, 112, 114, 116, 117, 118, and/or 119), for example, when the same data needs to be accessed by both training and predictive models. IDC 119 provides resource optimization by ensuring data is processed and stored in a way that minimizes memory usage and computational load, especially important in cloud-based architectures. In some embodiments ADC 119 facilitate the sharing of extracted features and depth information among different machine learning models, improving the efficiency and effectiveness of the system by leveraging learned information across tasks.

Figure 2:
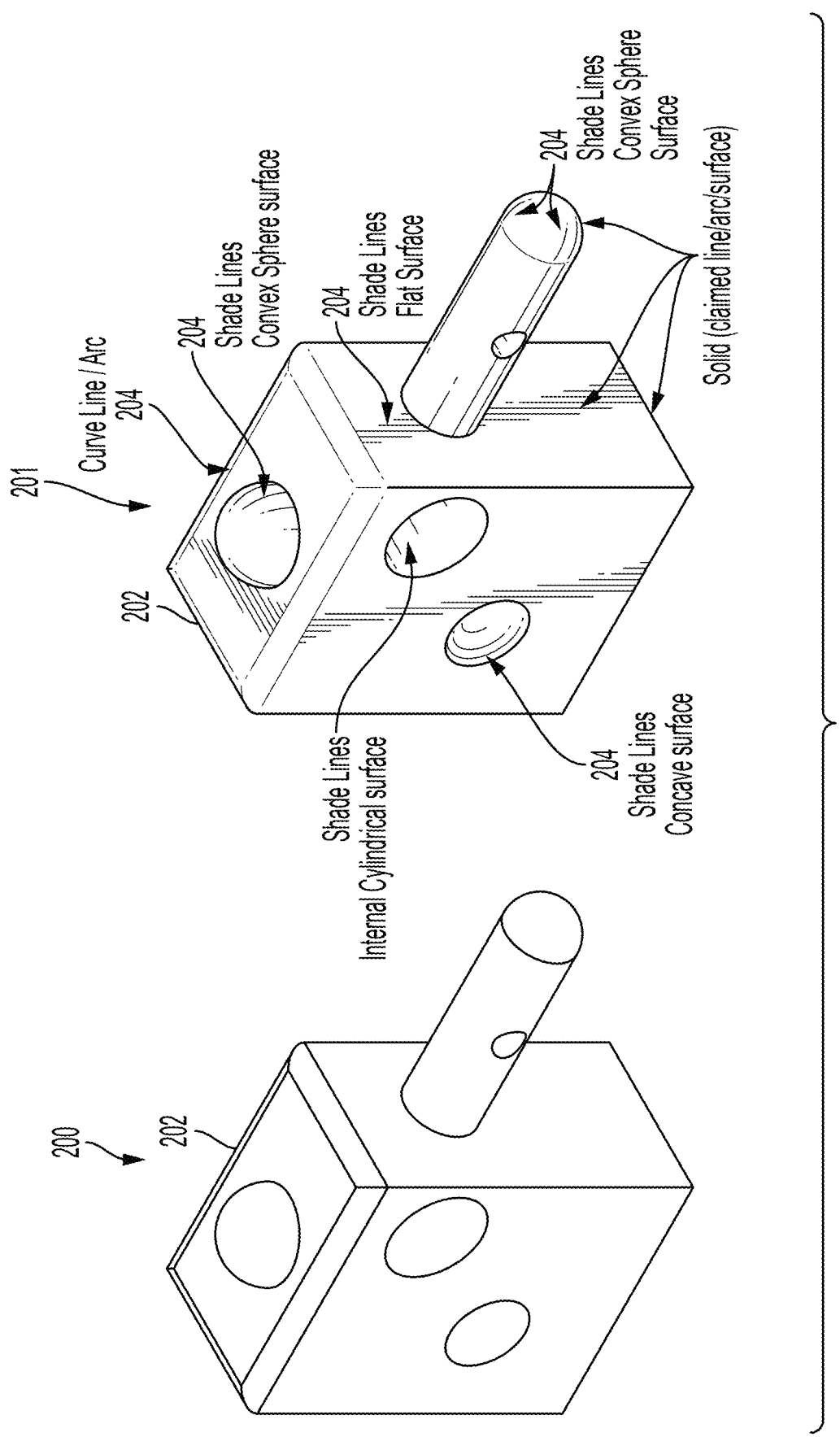
FIG. 2 illustrates a schematic of an 3D object correlated with a 2D shaded contour rendering, in accordance with some embodiments.
Figure 3F:
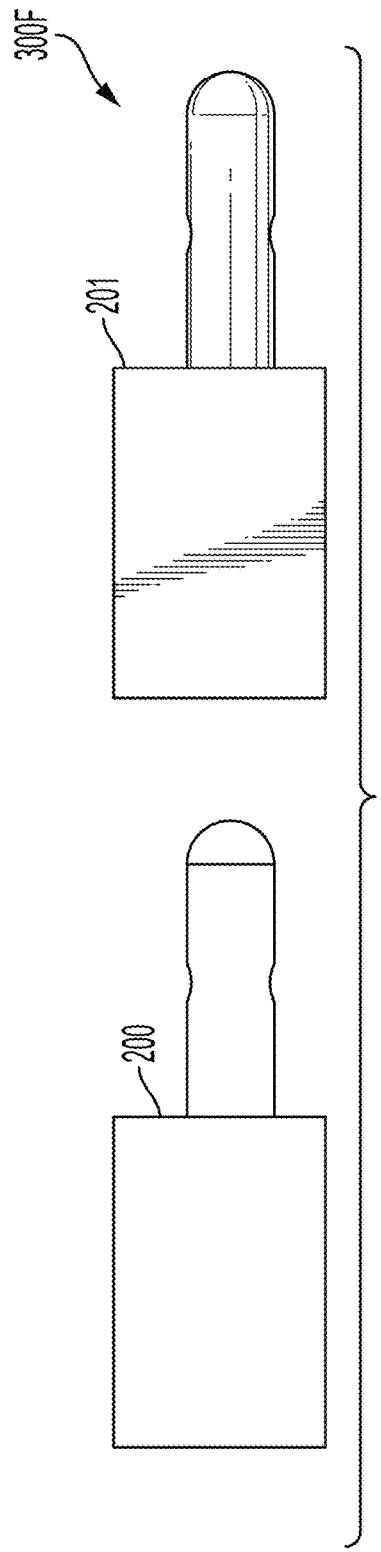
Figure 3G:
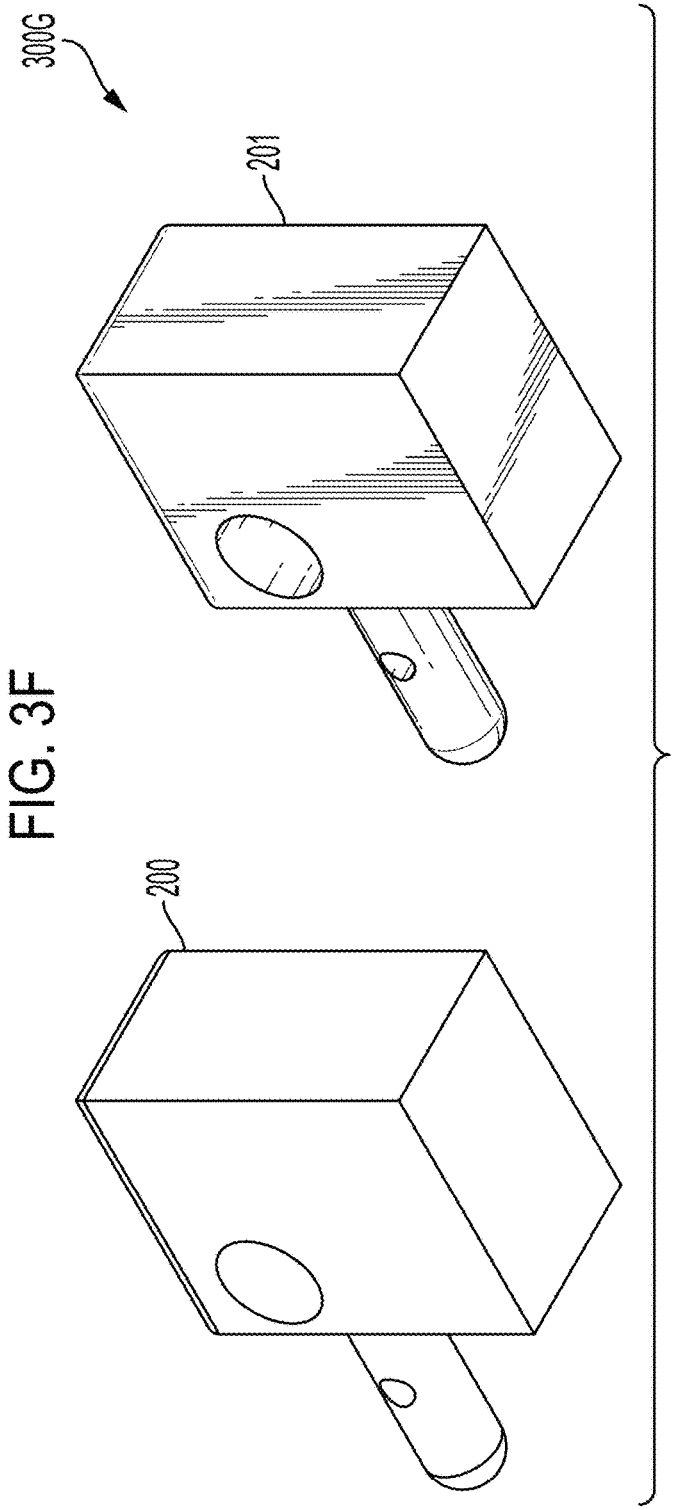

Referring now to FIGS. 2-3, in conjunction with FIG. 1, FIG. 2 depicts a 3D CAD model of a physical object 200 and a corresponding 2D shaded contour rendering 201 of the physical object 200. As shown, in FIG. 2, object 200 shown in so-called CAD wireframe does not communicate depth information well. Rather, shaded contour rendering 201, displays such depth information via shade lines 204 that distinguish the contour of object 200 despite being shown in 2D. Such contour of object 200 in the 3D model may be mapped to surface shading in the output file. Shading is of particular importance in the showing of three-dimensional articles, where shade lines 204 are advantageous to delineate plane, concave, convex, raised and/or depressed surfaces of object 200, and to distinguish between open and solid surfaces. Transparent and translucent surfaces may be indicated by oblique line shading (not shown).

Accordingly, in some embodiments, training module 110 may execute a method of training a machine learning model for generating predictive shaded contour renderings having shade lines 204. Such method may contrast an unshaded CAD model (e.g., object 200) with a shaded contour rendering counterpart (e.g., shaded contour rendering 201), annotated with labels for various surface types. In some embodiments, the approach for training the machine learning model, may include the classification of surface types (e.g., convex sphere surface, concave surface, flat surface, internal cylindrical surface, and the like) and the application of appropriate shading techniques, which is discussed in detail below.

Data Preparation and Image Classification Via CNN

In some embodiments, system 10 provides for data preparation and labeling. Input data for training the model includes raw images or processed features from the 3D CAD models. For each input image, the corresponding output should be the labeled image that includes surface and shading annotations for example, as shown in FIG. 2. For example, by accurately labeling the CAD models with the types of surfaces and their respective shading characteristics as shown in shaded image 201. Each type of surface (e.g., convex sphere surface, concave surface, flat surface, internal cylindrical surface, and the like) is clearly identified and marked. In some embodiments, the data preparation and labeling includes annotation. For example, the 2D engineering drawings (FIGS. 2B-2H) should be annotated similarly to how the shaded drawing is annotated in the example. Such annotations include curve lines, shade lines, and identification of linear surfaces. Accurate annotations will provide ground truth data that the model may learn from.

For example, object 200 corresponds to 3D CAD model of complex object containing detailed geometric data. The output is a 2D shaded contour rendering. As shown in FIG. 2A, object 201 includes data annotation. Each pair of input and output (200, 201) is prepared. In some embodiments system 10, via resources 120, may utilize several thousand input and output pairs for training the model. In some embodiments, tens of thousands, or hundreds of thousands of input and output pairs are implemented and are not shown here for clarity. In some embodiments, 3D CAD models, data preparation may include converting 3D CAD files into a format suitable for processing (e.g., raster images, simplified vector formats). The corresponding output file may be annotated, for example by indicating different features that should be recognized and transformed by the model.

Feature Extraction

In some embodiments, a method for training the predictive model includes edge detection. For example, by use of algorithms capable of detecting edges and curves to distinguish different parts of the object. Such detection may be implemented through deeper CNN layers specifically trained to recognize such features in CAD drawings, which is described in further detail below.

In some embodiments, the method includes surface analysis. For example, by implementing feature extraction techniques that may analyze textural and geometric features to classify different surface types. Such classification may include analyzing gradients in the image, curvature data derived from the CAD model, or other morphological features. Morphological features may refer to the shape and structure-related characteristics of objects within an image or 3D CAD rendering. Such features may be advantageous for tasks such as image segmentation, object detection, and feature classification in machine learning models. Some embodiment may include one or more edges, corners and intersections, ridges and valleys, skeletons, convex hull, Euler number, texture features, area, perimeter, and compactness, aspect ratio, orientation, roundness and eccentricity, which are discussed in detail below.

Edges are the boundaries or contours of objects within an image. Edge detection is advantageous to separate different areas of an image based on abrupt changes in intensity. Corner and intersections points in the CAD file where two or more edges meet. Such features are often key to understanding the geometry of objects in images. Ridges are curve-like structures where the intensity of the image increases in multiple directions, while valleys are regions where the intensity decreases, which is useful of topographic modeling. The skeleton of a shape is a thin version of that shape that is equidistant to its boundaries. The skeletonization process helps in reducing image detail to preserve the general form of objects.

For example, some embodiments include a specific input configuration of parsing out the skeleton vs the contour features, then parsing the contour features to show curvature or surface shading of a flat plane. Akin to a form of Style Transfer. Style transfer is used to modify the overall visual appearance of texture. Essentially, this task allows to recompose the content of one image in the style of another. Some embodiments include custom segmentation used to differentiate between the specific parts or elements of an image. Specifically, custom segmentation works at a pixel-level—the goal is to assign each pixel in an image to the object to which it belongs (i.e. class label). Thus, the structure component or contour information should be classified and segmented, then contour information may undergo style transformation from wire frame contour data to surface shading style data. In some embodiments, custom segmentation of frame vs contours then shading may be an overlay on each surface having an independent plane. Some embodiments, may preprocess the data by converting the CAD models into a compatible format, such as voxel grids or point clouds, and resizing the output images to a consistent size.

Convex hull is the smallest convex shape that can contain an object in the image. Convex hull is advantageous for object recognition and shape analysis, by providing the boundary within which other points of the object lie. Euler Number is a scalar value that describes the topology of the image. Euler number provides the number of objects in the image minus the number of holes in those objects, which can be advantageous for characterizing the connectivity properties of the image.

Texture features describe the arrangement and distribution of pixels in an image region. Texture analysis can include measurements of smoothness, coarseness, and regularity. Area, perimeter, and compactness features are basic geometric features that describe the size and shape of an object. Compactness, for example, compares the area of the object to the area of a circle having the same perimeter, providing insight into how circular the object is. Aspect Ratio is the ratio of the width to the height of the bounding box of the object. Aspect ratio is advantageous for distinguishing between objects of similar shapes but different orientations.

Orientation is the angle at which an object is oriented in an image. This feature helps in understanding the position of the object relative to other objects or the frame of the image. Roundness and Eccentricity features describe how much an object deviates from being circular. Eccentricity measures the ratio of the distance between the foci of the ellipse and its major axis length, which provides insight into the elongation of the object.

In some embodiments, such morphological features may be extracted using specific techniques in image processing, such as thresholding, edge detection algorithms (e.g., Sobel, Canny), and morphological operations like dilation, erosion, opening, and closing. By analyzing such features, training module 110 may accurately interpret and classify objects in images, enhancing applications across various fields such as medical imaging, automated quality control, and even complex tasks like converting CAD models into detailed shaded contour renderings.

Predictive Model Architectures

As mentioned above, in some embodiments, training module 110 includes one or more Convolutional Neural Networks (CNNs). Given their proficiency in handling image data, trainer 110 includes a CNN tailored to not only recognize different parts of the 3D CAD file but also to understand the underlying 3D structure suggested by the 2D projection. In some embodiments training 110 includes Generative Models, including GANs, which are advantageous for generating the high-fidelity shaded contour renderings from the processed CAD data. Some embodiments may include a Conditional Generative Adversarial Networks (cGANs) to generate images that correctly apply the learned shading techniques to new drawings. For example, the "condition" may be a surface type and the desired shading, influencing the generator's output. In some embodiments, autoencoders and/or U-Nets may be employed for tasks like noise reduction or segmentation when needed before the final illustration generation, which is discussed in detail further below.

In some embodiments, training module 110 may split a global dataset into training, validation, and testing sets. The training set will be used for training the CNN, the validation set for tuning hyperparameters and evaluating model performance during training, and the testing set for assessing the model's performance on unseen data.

In some embodiments, training module 110 includes classification layer that distinguishes between different types of surface treatments—determining where shade lines should be applied based on the surface type. This is advantageous for training the model to replicate the labeling in the annotated examples. In some embodiments, training module 110 includes regression/segmentation layers. For example, based on the complexity of an object, additional layers may be used to predict exact positions for shade lines, which may include a regression or segmentation task.

In some embodiments, training module 110 includes loss functions. Such loss functions may utilize a combination of classification loss (such as cross-entropy) for surface type identification and pixel-wise loss (such as mean squared error) for accurate shade line placement. In some embodiments, training module 110 includes validation. For example, by using a split of the data not seen during the training phase to validate the model's accuracy and the model's ability to generalize to new, unseen CAD models.

In some embodiments, training module 110 includes a feedback loop that incorporate user feedback from initial predictions to refine model training, focusing particularly on areas where the model misclassifies surface types or incorrectly places shade lines. In some embodiments, training module 110 includes continuous learning. As more CAD models and annotations become available, continuously retrain and fine-tune the model to improve its accuracy and adapt to new types of drawings or changes in design standards. Thus, training module 110 provides a machine learning model that not only classifies different surfaces in CAD models accurately but also applies appropriate shading techniques.

Model Evaluation

In some embodiments, system 10, before deploying the model, advantageously provides evaluation and performance metrics using unseen data. This helps ensure the model generalizes well and produces shaded contour renderings that meet the required standards. For example, performance metrics may include visual quality that assesses the clarity, accuracy, and adherence to industry standards, for example, standards for design shaded contour renderings. In some embodiments, performance metrics may include accuracy metrics including SSIM (Structural Similarity Index), MSE (Mean Squared Error), or others suitable for assessing the fidelity of the generated images.

Once the model is trained and validated, the model is deployed into a production environment where it can receive new CAD model inputs and generate the corresponding shaded contour renderings via feature extraction 112, image generating 114, and output and delivery 116. System 10 may be deployed as part of a SaaS (Software as a Service) platform where users upload CAD files and receive back shaded contour renderings. Such deployment requires robust backend architecture to handle potentially large computations, especially when dealing with complex models and large files.

Generating new rendering may begin when users upload new CAD files to the system 10 via device 140. GUI 142 is designed to facilitate easy navigation and file management, ensuring a seamless user experience. Feature Extraction 112, once a CAD file is uploaded, then processes the input 3D CAD file to identify and classify key features and geometrical data. Feature extraction 112 uses advanced algorithms to analyze and extract advantageous details necessary for accurate illustration rendering.

The extracted features are then forwarded to the Image Generating 114. This module utilizes the trained machine learning models (e.g., training module 110) to transform the extracted data into detailed shaded contour renderings. For example, such renderings may be used for design patent submissions. For example, module 110 applies learned techniques to replicate the necessary style and detail required for patent documentation.

Output and Delivery 116 complies and formats the generated shaded contour renderings. Output and Delivery 116 ensures that the ill shaded contour renderings meet the required specifications and formats for industry standards, for example, for design patent illustration submissions. The illustrations are then made available for download or direct review on system 10, where users can easily access and inspect the generated output via device 140.

System 10 is configured for continuous improvement via a user feedback loop. User feedback is an integral part of the continuous improvement process. Users can provide feedback directly through the platform via GUI 142 after reviewing the generated rendering. In some embodiments, such feedback, along with any manual corrections submitted by the users, is collected and analyzed by feature extraction 112 and image generating 114 to refine and enhance the model's accuracy and output quality.

In some embodiments, training 110 may include model updates to accommodate changes in CAD technology and standards, and regular updates to the models within the Feature Extraction and Image Generating modules are conducted. These updates ensure that the system remains up-to-date with the latest advancements and continues to meet the evolving needs of users. By integrating the embodiments above, the AI-driven system 10 effectively bridges the gap between the intricate data contained in CAD models and the clear, standardized visual format required for 2D shaded contour renderings.

In some embodiments, training 110, feature extraction 112, image generating 114 may include one or more CNNs, U-Nets, and/or GANs, a brief review follows. CNNs are specifically designed to process images and are particularly effective at recognizing patterns and features within an image. CNNs consist of convolutional layers, pooling layers, and fully connected layers, which aid in extracting and learning important features from the images. CNNs are primarily used for tasks like image classification, where they identify and classify elements within an image. CNNs are efficient at recognizing patterns, textures, and other features in images due to architecture, which effectively captures spatial hierarchies. U-Nets, which are a type of CNN, are designed specifically for image segmentation tasks. They have a unique architecture that enables precise localization, making them ideal for tasks where you need to classify each pixel of an image (such as medical image segmentation). Like standard CNNs, U-Nets do not inherently generate new images but segment existing ones into different categorized parts.

GANs consist of a generator and a discriminator, where the generator learns to create synthetic data resembling the true data, while the discriminator learns to distinguish between real and generated data. GANs are especially popular for tasks like image-to-image translation, style transfer, and data augmentation. Autoencoders are unsupervised neural networks that are used for dimensionality reduction, feature extraction, and image transformation tasks. Autoencoders learn to compress the input data and then reconstruct back to an original form. Variational autoencoders (VAEs) and denoising autoencoders may be used for image transformation tasks. Transformers, originally designed for natural language processing tasks, have shown great potential for computer vision tasks as well. Vision transformers (ViT) divide an image into smaller patches, linearly embed these patches, and process them through self-attention mechanisms. They have been applied successfully to various image-related tasks, including image classification and image transformation.

Accordingly, in system 10, generating images by transforming CAD models into shaded contour renderings, in some embodiments, may involve integrating CNNs and/or U-Nets with other image generation networks. For example, in one embodiment autoencoders may be employed. For example, VAEs may generate new images by learning to encode an input into a lower-dimensional space and then decode back to an output image. A CNN serves as the encoder, capturing important features from the CAD model.

In some embodiments, training module 108 and/or image generator 114 may include one or more GANs configured for image generation. Such GANs may include a generator network that generates images from random noise or direct feature transformations, aiming to produce outputs as close as possible to real data (i.e., shaded contour renderings). GANs include a discriminator network that tries to distinguish between real shaded contour renderings and those generated by the generator. In some embodiments, the GAN training process involves improving the generator based on feedback from the discriminator until the generator's outputs are indistinguishable from actual shaded contour renderings.

Thus, in some embodiments, Feature Extraction 112, using a CNN or U-Net to analyze the CAD model and extract important features (e.g., edges, shapes, and relevant geometries and morphology). Image Generation 114 may input these features into a generative model (e.g., a GAN or the decoder part of an autoencoder) that has been trained to create high-fidelity shaded contour renderings from such features. System 10 effectively combines the analytical power of CNNs and U-Nets with the creative, generative capabilities of networks including GANs and/or autoencoders to produce new images that adhere to the required standards of shaded contour renderings.

Some embodiments include training the generative part of system 10, such as a GAN and/or the decoder of an autoencoder, to produce shaded contour renderings from extracted features. Such training may include training the GAN for generating shaded contour renderings. For example, a dataset of CAD models and corresponding shaded contour renderings will train the GAN to understand what an accurate shaded contour renderings encompasses when given certain features of a CAD model. In some embodiments, the generator learns to extract and use features directly during training. In other embodiments, a CNN is utilized to preprocess CAD models to extract and condense features, which are then fed into the generator, which is discussed in detail above.

In some embodiments, the generator starts by generating images from a random noise vector (initially) or a set of features extracted from CAD models (via CNN). The goal is to produce images that look like the corresponding shaded contour renderings. The Discriminator examines both the real shaded contour renderings from the dataset and the illustrations generated by the generator. Discriminator learns to distinguish real from fake, providing feedback to the generator. In some embodiments, the generator and discriminator are trained simultaneously. The generator aims to fool the discriminator by improving its output, while the discriminator gets better at identifying fakes. Over time, the generator's outputs should increasingly resemble real shaded contour renderings.

In some embodiments, autoencoders are trained to encode an input into a compressed latent space and then decode this representation back into an output that matches the original input. For generating shaded contour renderings, some embodiments employ the following training protocol, As with GANs, begin with a dataset of CAD models and corresponding shaded contour renderings. The encoder part of the network compresses a CAD model into a latent representation. Although typically, an autoencoder learns to recreate the input image, in the embodiments herein, the encoder learns from the CAD model features. The decoder may be trained to take the latent representation (derived from a CAD model) and generate a corresponding shaded contour rendering.

During training, the encoder-decoder network sees the CAD model as input and the shaded contour renderings as the target output. The loss is calculated based on how close the decoder's output matches the actual shaded contour renderings, not the original CAD model. Some embodiments employ various loss functions for visual tasks. For example, loss functions that preserve content and style, such as perceptual loss or a combination of mean squared error and adversarial loss (when combining with GAN-like features).

Such training processes are iterative and require numerous epochs of training, where an epoch represents a complete pass over the entire dataset. Hyperparameter tuning, adjusting learning rates, the architecture of the neural networks (number of layers, types of layers, etc.), and other parameters is advantageous to optimize performance. Some embodiments include validating the model using a separate set of data that was not seen during the training to ensure that the model generalizes well to new CAD models and can produce high-quality shaded contour renderings.

Some embodiments include strategies to mitigate large data requirements by data augmentation, transfer learning, synthetic data generation, and/or active learning. Data Augmentation increases the effective size of the dataset by applying transformations like rotation, scaling, and cropping to your training images. Such transformations help the model generalize better from fewer examples. Transfer learning utilizes a pre-trained model that has been trained on a large dataset for a similar task and fine-tune it on the CAD dataset. This may significantly reduce the amount of data required. Active Learning implements a strategy where the model identifies which new data points would be most beneficial to learn from, allowing trainer 108 to selectively annotate more data.

Integrating Features Vectors Into GANs

In some embodiments, system 10 integrates the outputs of CNNs and U-Nets into a Generative Adversarial Network (GAN) for the generation of shaded contour renderings from CAD models. As discussed above, CNNs and U-Nets are trained initially to perform tasks such as identifying key features, segmenting parts, or detecting contours in 3D CAD models (generally referred to as feature vectors). CNNs may identify specific features vectors like edges, textures, and shapes, while U-Nets may be used for more detailed segmentation tasks where precise delineation of model parts is necessary.

The outputs from CNNs/U-Nets consist of feature maps or segmented images, which are discussed further below. Feature maps are detailed representations that highlight important features detected in the input images. Segmented images from U-Nets will classify each pixel as belonging to a particular part or feature of the input CAD model.

In preparation for GAN input, the feature maps or segmented outputs from CNNs or U-Nets may be formatted suitably for use as inputs to a GAN. For example, by normalizing the data, flattening feature maps into a format that may be fed into the GAN, or encoding these maps into a more compact form. The GAN's generator is designed to accept these processed feature maps as input. Such design may include adapting the input layer of the generator to match the size and structure of the feature maps. In some embodiments, incorporating additional dense layers or convolutional layers may generate higher accuracy outputs.

During the training phase, the generator uses the feature maps to generate images that resemble the target shaded contour renderings. The discriminator's role is to differentiate between the generated images and real shaded contour renderings. The generator learns to improve its outputs based on feedback from the discriminator, aiming to produce images that the discriminator cannot easily distinguish from real illustrations.

Optimizing and Fine-Tuning

In some embodiments, CNNs and/or U-Nets and the GAN may be fine-tuned jointly in an end-to-end manner after initial separate training. This means adjusting the weights of both the feature extractor (CNN or U-Net) and the generator simultaneously based on the overall performance in generating shaded contour renderings. Such joint training may help in better integration of the feature extraction directly with generation, allowing the networks to adapt more holistically. In some embodiments, the loss functions may be tailored to account for both the accuracy of the feature extraction and the quality of the image generation. For example, by using a combination of classification loss (from the CNN/U-Net outputs) and adversarial loss (from the GAN).

In some embodiments, system 10 includes integration of 3D CAD models and 2D engineering views of the 3D CAD model to facilitate the generation of additional data points for training machine learning model. For example, preparation of 3D CAD models of a physical objects provides a comprehensive spatial structure of the physical object, revealing insights into the physical objects' depth, perspective, and complex geometries. Complementing the 3D CAD file, system 10 may generate six 2D engineering views, encompassing the six standard perspectives (front, back, top, bottom, left, right). These views are advantageous for understanding how different features of the object are represented from multiple angles in a flat format, offering advantageous visual information for accurate modeling.

In some embodiments, the method of training the predictive model includes a 3D/2D data correlation phase, which involves the development of sophisticated algorithms designed to map identifiable features from the 3D CAD models to their corresponding elements in the 2D engineering views. Such feature mapping process may focus on pinpointing key points, edges, and surfaces in the 3D model and aligning such key points with their equivalents in the 2D views. Additionally, projection mapping techniques are employed to correlate the depth information from the 3D model with the outlines and features visible in the 2D views, thereby ensuring the AI model can accurately interpret which elements of the 2D drawings correspond to raised or recessed areas in the 3D object.

In some embodiments, training phases described above may integrate both the 3D model data and the correlated 2D views as paired training data into the AI model. This approach enables the model to learn how depth and surface variations are depicted across different views, enhancing its predictive accuracy for new illustrations. The model architecture is designed as a hybrid neural network, utilizing CNNs to extract features from 2D views and 3D convolutional networks to manage the spatial data from 3D models. The training target is to generate final 2D shaded contour rendering that accurately reflect the depth and design details with detailed contour lines and surface shading. Such 2D shaded contour renderings may be utilized, for example, in design patent illustrations.

In some embodiments, image generation post-training, includes applying the learned correlations to new CAD files, incorporating both 3D and their respective 2D views, to generate detailed 2D shaded contour renderings. This stage demonstrates the application of the model's training, using the established feature mappings and depth associations to accurately predict and render features and depths in compliance with shaded contour feature rendering standards.

For example, the refinement process may involve applying additional algorithms post-image generation to adjust line weights, enhance shading, and ensure illustrations meet the required industry drawing standards. The validation process employs a suite of tools or manual checks to verify that the generated illustrations faithfully represent the original CAD models in both form and function.

System 10 modules may accommodate the additional training correlation. For example, data management 108 may expanded to effectively process and store both 3D models and multiple 2D engineering views. Feature Extraction 112 may be enhanced to perform complex mappings between 3D features and their 2D representations. Training 110 is adapted to handle multi-input training sessions involving both types of data. Image Generation Module is configured to utilize sophisticated algorithms that incorporate the depth and contour information derived from the 3D/2D data correlation.

Through this integrated approach, the AI system is capable of creating highly accurate and detailed shaded contour feature renderings that are technically informative and compliant with patent filing requirements. This method significantly enhances the model's capability to produce reliable drawings that are essential for protecting intellectual property, streamlining a traditionally manual and labor-intensive process.

Data Structure for Training a Predictive Model

Figure 4:
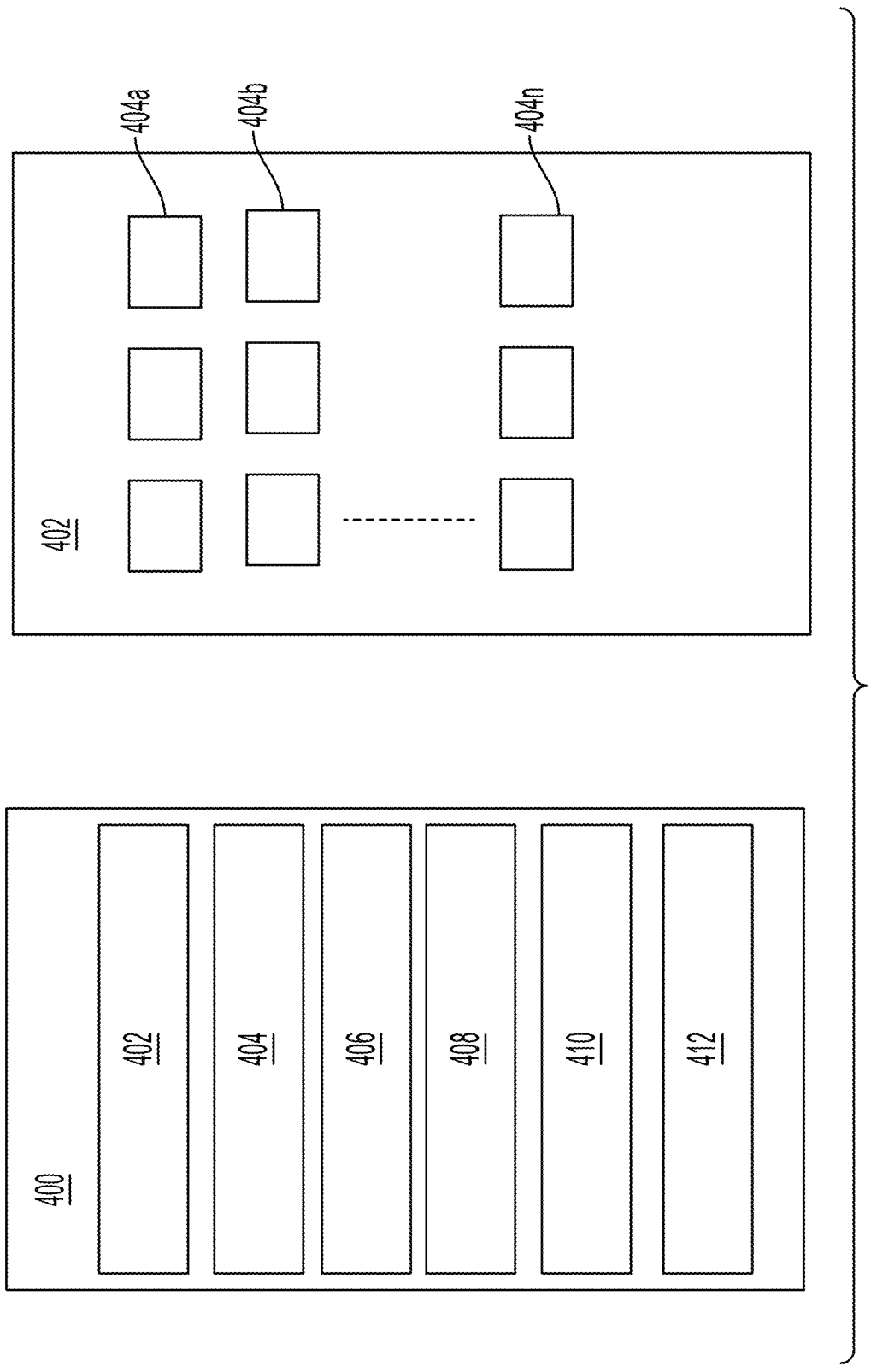
FIG. 4 depicts a data structure for training a neural network and generating shaded contour renderings, in accordance with some embodiments.

Referring now to FIG. 4, in conjunction with FIGS. 1-3, in some embodiments, integrated data correlation 119 includes generating an AI data structure 400. In some embodiments, data structure 400 is configured for the efficient correlation of the 3D CAD to the 2D engineering views that increases efficiency and accuracy in the training model and predictive model of the embodiments described above. In some embodiments, system 10, includes an efficient and accurate data structure 400 for correlating 3D CAD models to 2D engineering views involves designing a structure that can handle and integrate complex spatial and visual data effectively. Data structure 400 facilitates rapid access and manipulation of the data for both training the machine learning models and generating the output illustrations. In some embodiments, integrated data correlation 119, includes, generates, and outputs data structure 400 as follows:

In some embodiments, data structure 400 may include contour feature data 402, which maintains a direct correlation between 3D objects and their respective 2D views in a way that is easily accessible by the AI models and system 10 components (e.g., 108, 110, 114, 116, 118, and/or 119). In some embodiments, contour feature data 402 includes one or more bit(s) corresponding to a 3D Model Representation that stores a pointer to complete 3D CAD model data for the corresponding physical object. In some embodiments, such data may include a format that includes vertices, edges, faces, and metadata about materials and textures of the object (e.g., 200).

In some embodiments, data structure may include a 2D View Array 404. 2D view array 404 may include an array or a list of 2D view objects, where each object represents one of the standard engineering views (front, back, top, bottom, left, and/or right). Such lists and arrays may store pointers to locate further data. Data structure 400 may include a Feature Linking Table (FLT) 406 that maps specific features in the 3D model of object 200 to their manifestations in each 2D view (e.g., FIGS. 3A-3G).

In some embodiments, data structure 400 may include a structure value 408. Structure value 408 may include one or more of: a Feature ID that corresponds to a unique identifier for each feature in the 3D model, 3D coordinates corresponding to spatial coordinates of the feature in the 3D model, 2D Coordinates Maps mapping of the 3D feature to respective coordinates in individual 2D views. In some embodiments, such mapping may be structured as a dictionary or a set of key-value pairs where keys are view identifiers and values are coordinate pairs or bounding boxes. For example, by way of linked look up tables. In some embodiments, such look up tables may be remotely linked via resources 120 or stored by server 102 and/or data manager 108.

In some embodiments, data structure 400 may include depth data 410. Depth data 410 may include a depth information layer or depth map to enhance the 2D views with depth information derived from the 3D model, which is advantageous for accurate shading and contouring. In some embodiments, depth data 410 may include a pointer to a depth map, which may include a grid or matrix associated with each 2D view. Such grid or matrix indicates the depth of features at various points, facilitating the application of correct shading techniques in the output illustrations.

In some embodiments, data structure 400 is operable for integration with Neural Networks utilized by system 10 (e.g., CNNS, U-Nets, and/or GANs). Data structure 400 may be directly fed into system 10 neural networks, for example, via data manager 108 and/or integrated data correlation 119. System 10 neural networks and are trained to understand and process the relationships between 3D features and their 2D projections, discussed above. In some embodiments, utilizing depth data 410 and data structure 400, CNNs, and/or U-Nets may be adapted to process 2D views with associated depth maps as multi-channel input images, where one channel represents visual data and another represents depth data. Such functionality may be directed by multi-channel bits 412.

Discussed in further detail below, in some embodiments, data structure 400 may be operable for optimization efficiency and accuracy via indexing, normalization, and/or batch processing. For example, implementing indexing on FLT 406 to speed up queries and data retrieval is advantageous during the training and generation phases. Such indexing creates a searchable database index for one or more columns (attributes) in the table, such as feature identifiers or keys that are frequently queried. Searchable attributes allow database systems (e.g., server 102) to find the data associated with these keys much faster than scanning every row in the table reduces the time complexity from linear to logarithmic in many cases.

Indexing is further advantageous during complex queries that involve multiple joins or where specific subsets of data are frequently accessed, such as during the matching of 3D features to 2D features of frequently encountered shapes. By decreasing the time spent on searching and retrieving data, indexing minimizes CPU and memory usage. This optimized resource utilization is advantageous when dealing with large datasets for training predictive models with CAD models and engineering drawings, as described herein. As the dataset grows with more CAD files and engineering views, the benefits of indexing become increasingly significant, allowing system 10 to scale more efficiently.

For real-time processing, such as in the image generation process where speed is advantageous, having an indexed table means that feature data necessary for generating accurate shaded contour feature illustrations may be retrieved almost instantaneously. During the training phase, where large batches of data are processed, indexing significantly reduces the overhead of fetching the relevant data repeatedly, thereby speeding up the training process.

Moreover, indexing helps maintain data integrity by ensuring that each entry is unique as per the indexed attribute, which is advantageous when entries are frequently updated or modified during the training phase. By facilitating faster and more accurate data retrieval, indexing reduces the likelihood of errors that might arise from incorrect data mapping or prolonged data fetching operations. The immediate feedback made possible by quick data retrieval supports faster adjustments and optimization of algorithms and model parameters In some embodiments, normalization allows for storing 3D and 2D coordinates in a normalized format to reduce computational overhead and improve the model's learning efficiency. And, in some embodiments, data structure 400 is configured for batch processing, where multiple instances of data structure 400 *n* are batched together for parallel processing.

For example, during training, CNNs/U-Nets/GAN models may use FLT 406 of data structure 400*n* to learn how features represented in the 3D model appear in different 2D views under various transformations and projections. Depth data 410 having depth information layers may be used to train CNNs/U-Nets/GAN models on how to apply contour feature shading based on the depth of features, improving the realism and technical accuracy of generated shaded contour renderings. Such structured approach not only enhances the accuracy of the AI model in correlating 3D models to their respective 2D views but also increases the efficiency of the training process by providing well-organized and easily accessible data. Additionally, data structure 400 supports scalability and flexibility, accommodating various types of CAD models and/or engineering drawings.

In some embodiment, data structure 400 may be used in the GAN network for output predictive images based on a new 3D or 2D CAD models input by a user via user device 140. For example, data structure 400 of the embodiments herein is structured to correlate 3D CAD models with their corresponding 2D engineering views, which is advantageous not only for training neural networks but also for integrating into a Generative Adversarial Network (GAN) framework. Such structure may significantly enhance the GAN's capability to generate accurate and detailed predictive shaded contour feature illustrations from new CAD models input by users.

For example, system 10 integrates data structure 400 with GANs, in preprocessing and input preparation, specifically feature extraction. In some embodiments, when a new 3D CAD model or a set of 2D views is uploaded by a user via device 140, system 10 may process new inputs using, for example, FLT 406 and depth data 412 having depth information layer. This operation involves identifying advantageous features in the input CAD model and mapping identified features to corresponding representations in the 2D engineering views.

In some embodiments, simultaneously, or substantially simultaneously, a depth map 402 for each 2D view is generated or updated based on the 3D model, indicating the relative depth of different features. This is advantageous for realistic shading in the illustrations. Next the processed features and depth maps 402 are formatted as inputs to the GAN (e.g., via module 108, 112, 114, and/or 119). In some embodiments, such formatting may include structuring data into channels 404 where one set of channels 404a carries the 2D view information and another set of channels 404b carries the depth information. In some embodiments, normalization and scaling may further ensure that data fed into the GAN match the network's input requirements, maximizing the effectiveness of feature learning and image generation by feature extraction 112 and image generating 114, respectively.

In some embodiments, training module 110 may include generator modifications (GM). For example, GM may adapt the generator of the GAN to take such structured data (e.g., data structure 400) as input. GM may enhance the generator's architecture to process multiple types of data (e.g., visual features from 2D views and depth data) simultaneously and effectively. Some embodiments may include discriminator enhancements by modifying the discriminator to evaluate not just the realism but also the technical accuracy of the generated images based on how well they incorporate the depth and feature information derived from the 3D model and 2D views.

In some embodiments, training module 110 may train the GAN with training data utilization of a mix of historical and real-time processed data from the data structure 400 to train the GAN. This helps the network learn a comprehensive range of feature representations and depth variations, enhancing its ability to generalize from new CAD model inputs. Some embodiments include a feedback loop mechanism via feedback manager 117, wherein the output from the GAN is checked against the expected features and depth specifications from data structure 400. Any discrepancies may be used to fine-tune the generator's performance.

Generating Predictive Shaded Contour Renderings

Once the GAN model is trained, the GAN model may generate predictive shaded contour feature illustrations (e.g., FIGS. 3a-3h) directly from new CAD model inputs and/or data fed from CNNs/U-Nets discussed herein. As mentioned above, the generator uses the structured input to create detailed 2D engineering views that accurately reflect both the geometry and depth features of the objects depicted in the 3D CAD models (e.g., object 200), as mapped and structured in data structure 400.

Some embodiments may include post-processing by applying additional image processing to refine the illustrations, and continuously updating FLT 406 and depth maps 410 within data structure 400. In some embodiments, feedback manager 117, manages user feedback received from device 140. Any discrepancies are noted between generated images and actual CAD models, and updates provided to data structure 400. Such post processing and iterative refinement improves the accuracy and reliability of the generated 2D shaded contour renderings.

Such tailored approach to integrating a specialized data structure into a GAN framework not only streamlines the process of generating shaded contour renderings but also significantly enhances the quality and accuracy of the outputs. By leveraging detailed feature and depth data from both 3D and 2D CAD models, system 10 may output highly detailed and technically accurate shaded contour feature rendering, which are advantageous for documentation such as in design patent applications. Such integration showcases a powerful example of implementing advanced data structures within AI frameworks to solve complex real-world problems.

In some embodiments, such data structure 400 may be a python-based data structure. A Python-based data structure may be advantageous to handle the complex relationships between 3D CAD models and their corresponding 2D engineering views. In some embodiments, a python-based data structure for use in a GAN for generating shaded contour renderings, involves designing classes that may encapsulate necessary attributes and methods.

For example:

```
class CADModel:
    def __init__(self, model_id, model_data):
        self.model_id = model_id
        self.model_data = model_data # This could be a file path or data blob
        self.features = [ ]
    def add_feature(self, feature):
        self.features.append(feature)
class Feature:
    def __init__(self, feature_id, description, coordinates_3d):
        self.feature_id = feature_id
        self.description = description
        self.coordinates_3d = coordinates_3d # (x, y, z) coordinates in the 3D model
        self.views = { }
    def add_view(self, view_name, coordinates_2d):
        self.views[view_name] = coordinates_2d # (x, y) coordinates in 2D views
class EngineeringView:
    def __init__(self, view_name, image_data):
        self.view_name = view_name
        self.image_data = image_data # This could be a file path or image data blob
        self.depth_map = None
    def generate_depth_map(self, depth_data):
        self.depth_map = depth_data # A matrix or image representing depth values
class GANInputData:
    def __init__(self, features, depth_maps):
        self.features = features # List of features formatted for GAN
        self.depth_maps = depth_maps # Combined depth maps from multiple views
```

```
class GAN:
    def __init__(self, generator, discriminator):
        self.generator = generator
        self.discriminator = discriminator
    def train(self, training_data):
        # Implement training logic here
        pass
    def generate_image(self, input_data):
        # Implement image generation logic here
        return "generated_image_path"
```

Thus, the Python-based data structured and process above facilitates a structure for handling and correlating data between 3D and 2D representations and is configured to be expanded with actual data handling and neural network integration for generating shaded contour renderings.

That data structure 400 is operable for managing and correlating 3D CAD models with their corresponding 2D engineering is advantageous in optimizing both the computational efficiency and the accuracy of the generated shaded contour renderings. A review of how such data structure enhances the functionality of a computer system for training a neural network, particularly in terms of processing resources, memory capacity, and the accuracy of the renderings follows:

Because data structure 400 organizes data in a way that features and corresponding views are directly linked, such organization allows for quick access to relevant data when needed, reducing the time spent searching through unstructured data collections. By structuring the data to support batch processing, where similar types of data are processed together, supra, system 10 may take advantage of vectorized operations and parallel processing capabilities. This is particularly effective in reducing processing time during both training and inference phases of machine learning models. Having a structured linkage between 3D features and their 2D representations means that once a feature is processed or a depth map is generated, the data may be reused across different tasks without needing to be recalculated. This minimizes redundant computations, thereby saving processing resources.

Data structure 400 facilitates Memory Optimization via Selective Loading and Load on Demand. Data structure 400 allows components (e.g., 108-119) of the system to load only the necessary pieces of data into memory when required. For example, if a particular 2D view or feature is not relevant to a current processing task, such feature may remain unloaded, thereby saving memory. Compact storage, by organizing features and corresponding mappings in a structured format (e.g., FLT 406, arrays 402), the data can be stored more compactly compared to loose or unstructured formats. Efficient data encoding and compression techniques can further reduce memory usage.

Data structure 400 facilitates enhanced accuracy of renderings via precise feature mapping. The detailed mapping of features from 3D models to their 2D projections ensures that important details are not lost in translation. This is advantageous when rendering images that must adhere to the stringent industry standards. The inclusion of depth maps in the data structure allows the rendering process to incorporate accurate shading and contouring based on the spatial information from the 3D model. This adds realism and technical accuracy to the 2D illustrations, which is advantageous for industry use.

By maintaining a consistent format and linkage between 3D and 2D data, system 10 ensures that all transformations and renderings are based on the same baseline data. This consistency helps in maintaining the accuracy across different views and renderings. The structured nature of the data facilitates robust checks and validations to ensure that the mappings and renderings are correct. Discrepancies may be quickly identified and corrected, which is advantageous for training machine learning models to produce reliable outputs.

Moreover, the machine learning models may focus on learning the most relevant features and their transformations, as irrelevant data may be easily excluded from the training process due to the structured data format. Such targeted learning improves the efficiency and effectiveness of the models. For example, with quick access to structured and correlated data, models may be iteratively trained and fine-tuned faster. This speeds up the model development cycle and allows for quicker adjustments based on performance feedback.

Thus, employing data structure 400 not only improves the efficiency and capacity of the computing resources of system 10, but also significantly enhances the accuracy and reliability of the generated shaded contour renderings output to user device 140. This dual benefit of operational efficiency and technical precision is particularly valuable, for example, in the context of generating design patent illustrations, where both accuracy and processing efficiency are paramount.

Figure 5:
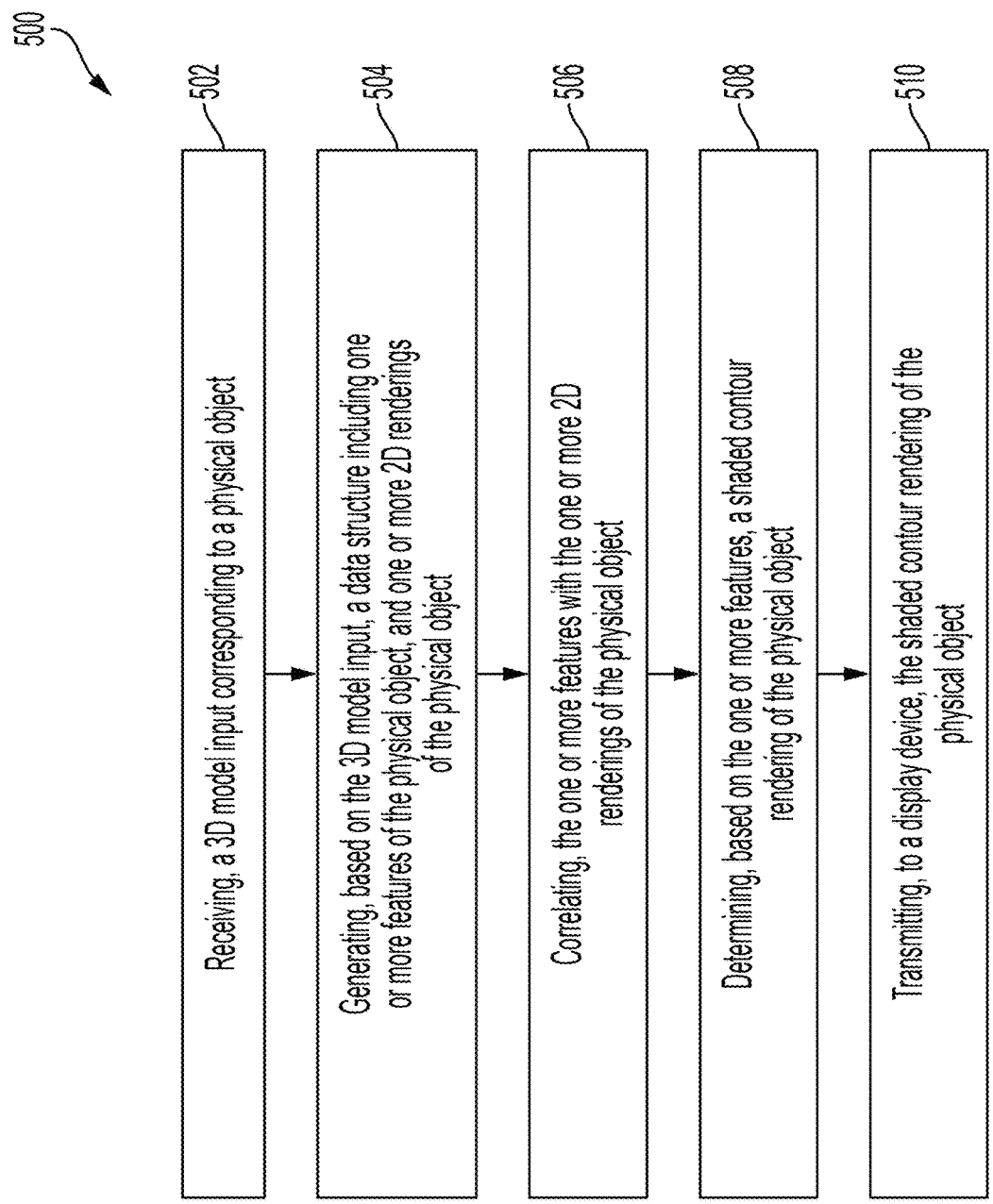
FIGS. 5-7 depict flow diagrams of exemplary methods for training a neural network and generating shaded contour renderings, in accordance with some embodiments.
Figure 6:
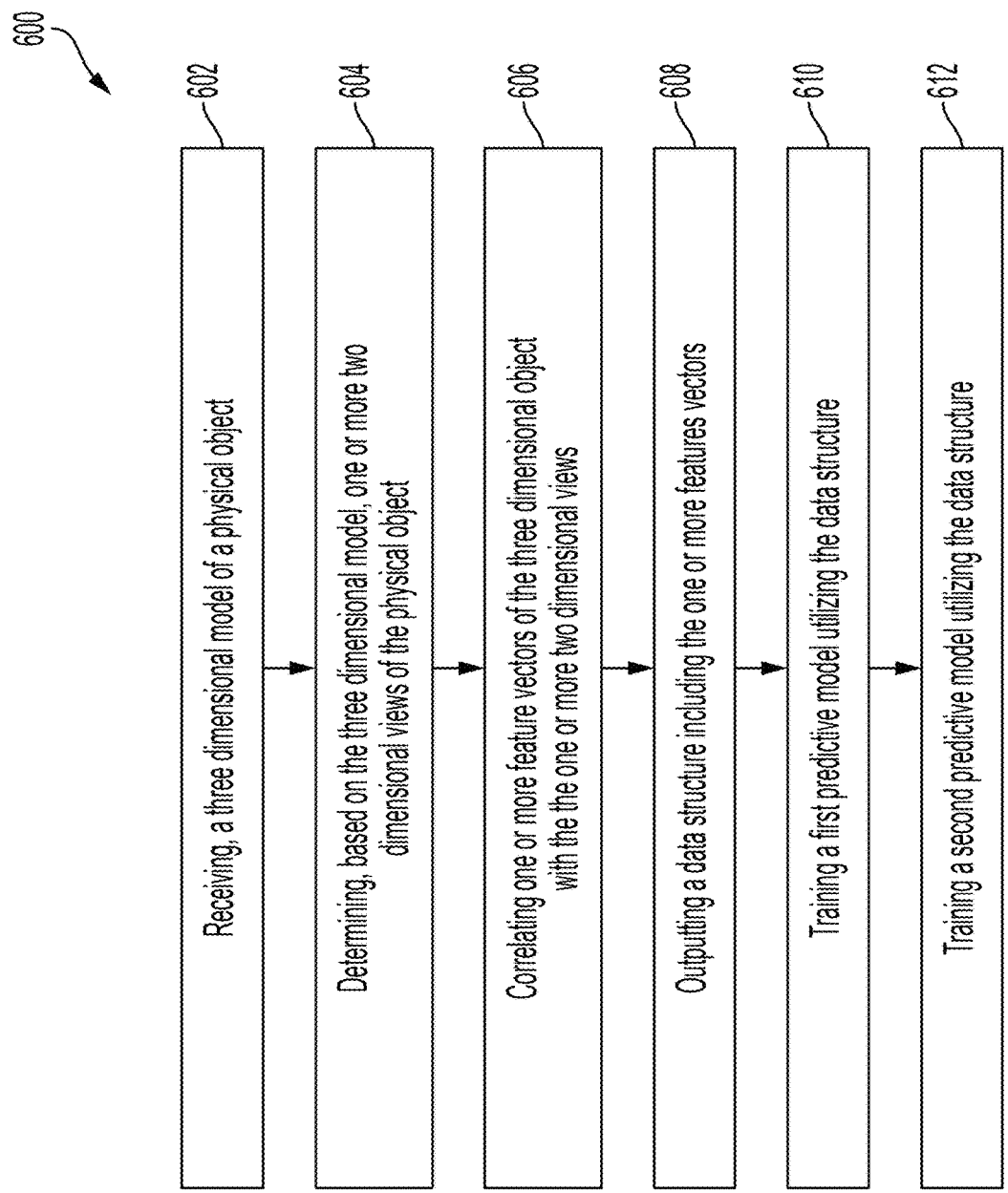
Figure 7:
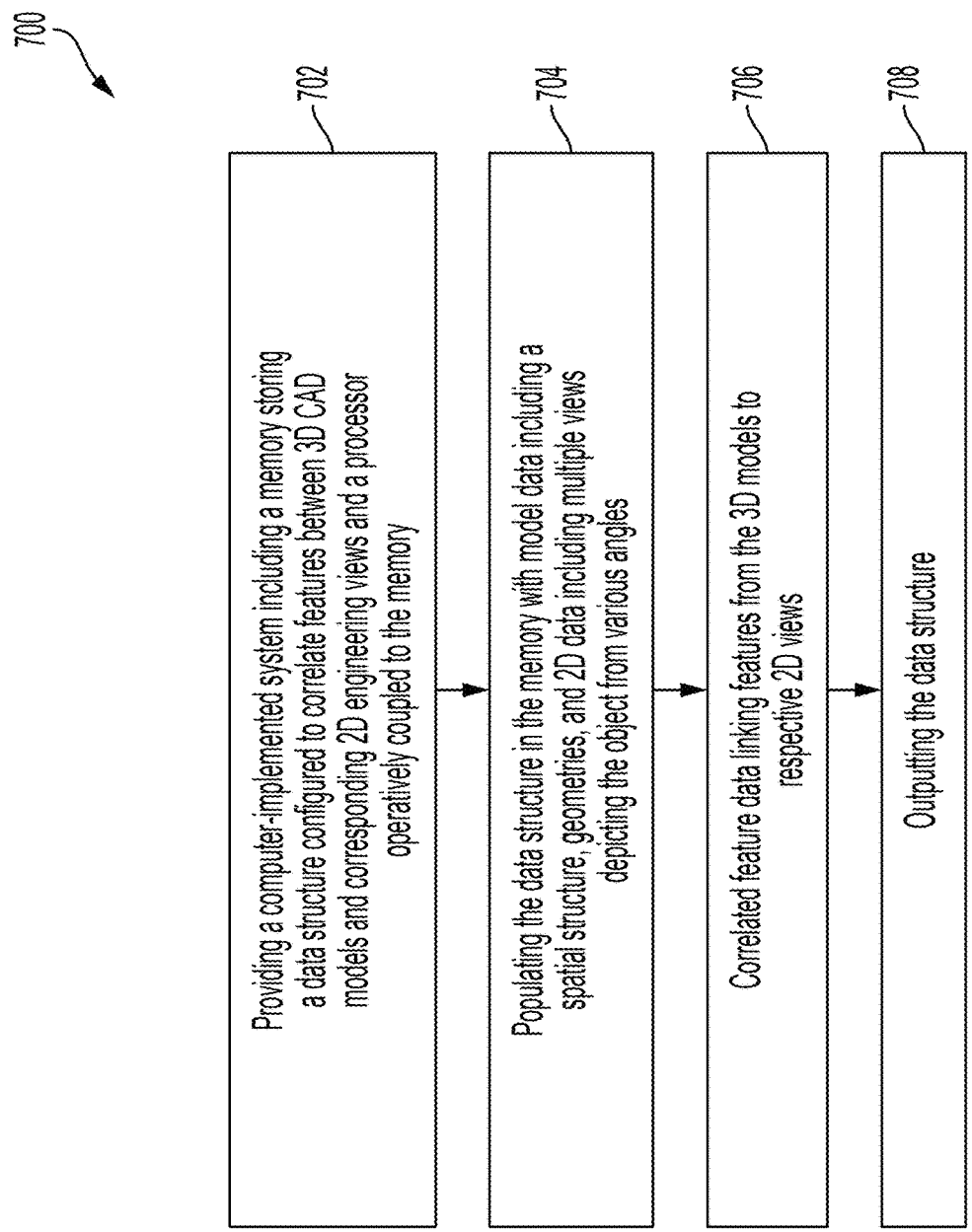

Referring now to FIGS. 5-7, in conjunction with FIGS. 1-4, FIG. 5 depicts a flow chart for a method 500, in accordance with one or more embodiments described above. Method 500 includes, at an operation 502, receiving, a 3D model input (200) corresponding to a physical object (202). At an operation 504, generating, based on the 3D model input, a data structure (400) including one or more features (402) of the physical object, and one or more 2D renderings (300) of the physical object. At an operation 506, correlating, the one or more features with the one or more 2D renderings of the physical object. At an operation 508, determining, based on the one or more features, a shaded contour rendering of the physical object. At an operation 510, transmitting, to a display device, the shaded contour rendering of the physical object. In some embodiments, operation 502-510 may be executed by modules 108-119.

FIG. 6 depicts a flow chart for a method 600, in accordance with one or more embodiments described above. Method 600 includes, at an operation 602, receiving a three-dimensional model of a physical object. At an operation 604, determining, based on the three-dimensional model, one or more two dimensional views of the physical object. At an operation 606, correlating one or more feature vectors of the three-dimensional object with the one or more two dimensional views. At an operation 608, outputting a data structure including the one or more features. At an operation 610, training a first predictive model utilizing the data structure. At an operation 612, training a second predictive model utilizing the data structure. In some embodiments, operation 602-612 may be executed by modules 108-119.

FIG. 7 depicts a flow chart for a method 700, in accordance with one or more embodiments described above. Method 700 includes, at an operation 702, providing a computer-implemented system including a memory storing a data structure configured to correlate features between 3D CAD models and corresponding 2D engineering views and a processor operatively coupled to the memory. At on operation 704, populating the data structure in the memory with model data including a spatial structure and 2D data including standard views depicting the object from various angles. At an operation 706, correlating feature data linking features from the 3D models to respective 2D views. At an operation 708, outputting the data structure. In some embodiments, operations 702-708 may be executed by modules 108-119.

Figure 8:
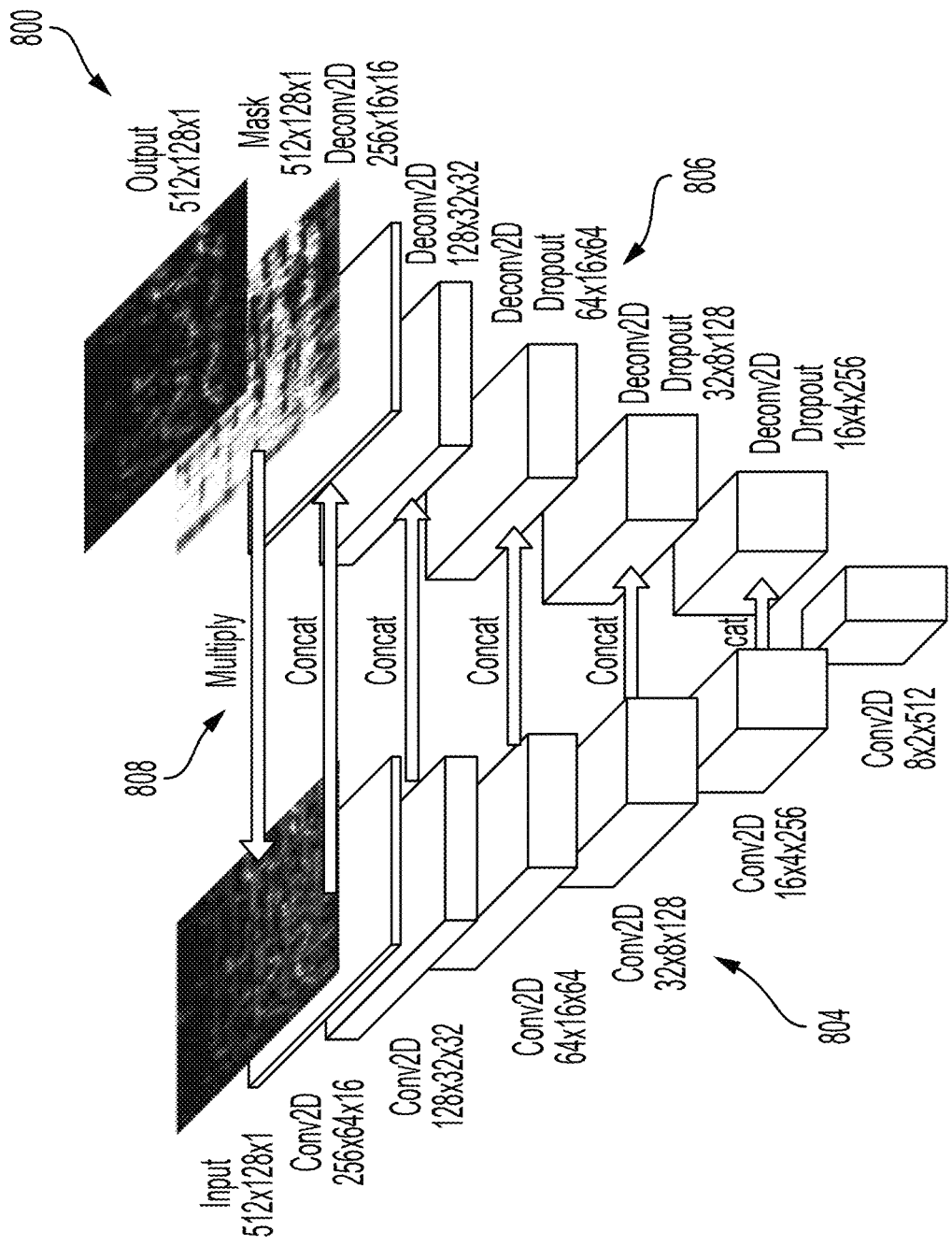
FIG. 8 depicts a schematic of a neural network for 3D object correlation, in accordance with some embodiments.

Referring now to FIG. 8, in some embodiments a U-Net architecture is employed by system 10 for training a predictive model for outputting 2D shaded contour renderings. In some embodiments, such architecture may include into two primary pathways: an encoder path 804 and a decoder path 806, both intricately designed as a feature pyramid network (U-Net) 800 with strategically implemented skip connections 808. As shown in FIG. 8, encoder path 804 of U-Net 800 methodically downsamples the image through a series of convolutional and pooling layers. This sequential reduction serves to distill the input into a form where high-level features are extracted while minimizing spatial dimensions. Encoder pathway 804 is advantageous for isolating significant characteristics from the CAD model inputs, such as edges, textures, and distinct geometrical patterns, which are advantageous for the subsequent stages of the feature extraction (e.g., 112).

Contrasting the encoder, the decoder path 806 reconstructs the segmented output back to the resolution of the original input image. This is achieved by progressively upsampling the condensed feature maps, allowing for a gradual restoration of the image's detailed structure. The upsampling process is intricately designed to refine the output, ensuring that the generated shaded contour feature renderings are not only accurate but also adhere to the stringent details required for industry filings.

In one embodiment, an integral feature of the U-Net's design is the inclusion of skip connections 808 that span between corresponding layers of the encoder and decoder paths. These connections are advantageous in preserving and transferring fine-grained details that might otherwise be lost during the downsampling process. In some embodiments, by concatenating feature maps from the encoder directly to the corresponding decoder layers, skip connections 808 ensure that both local details and global contextual information are retained, enhancing the fidelity and precision of the reconstructed images.

Within system 10, the U-Net architecture 800 is integrated to leverage advanced segmentation capabilities. This integration is advantageous for accurately mapping the complex geometries of 3D CAD models to their respective 2D engineering views in the Feature Extraction Module 112, discussed above. U-Net's 800's efficient handling of both local and global features ensures that the final image outputs are of high quality, with precise alignments and clear representations of the 3D CAD models' intricate details, advantageous for the legal robustness of output renderings.

Thus, system 10 represents a significant advancement in the field of computer-aided design and shaded contour feature illustration generation. By leveraging state-of-the-art machine learning technologies, including CNN/U-Net architectures and GANs, along with sophisticated data structuring techniques such as the Feature Linking Table with indexing, the embodiments herein effectively bridge the gap between complex 3D CAD models and their requisite 2D shaded contour illustrations. This not only eliminates a traditionally manual and labor-intensive process but also enhances the precision and accuracy of the final renderings.

The integrated modules 108-119 work in concert to ensure a seamless, efficient, and user-friendly experience. Modules 108-119 collectively manage the intricate data handling, feature mapping, image synthesis, and final illustration formatting and delivery, making the system highly scalable and capable of adapting to various industrial needs and evolving technological landscapes. Furthermore, the system's ability to learn from historical data and continuously improve through user feedback and regular model updates places it at the forefront of innovation in AI-driven design technologies. This allows for ongoing refinement of processes and methodologies, ensuring that the system remains relevant and effective in meeting the stringent requirements of patent documentation.

The AI-powered solution of the embodiments herein not only streamlines the creation of renderings suitable for design patent illustrations but also significantly reduces the time and resources required for their production, providing a competitive edge to patent applicants and contributing to more robust intellectual property protection. As such, this technology holds great promise for transforming patent illustration practices, offering profound benefits to industries reliant on patent protections to safeguard their innovations.

The embodiments described herein may be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above-described advantages are not intended to limit the application of any issued claims to processes and structures accomplishing any or all of the advantages.

Furthermore, any reference to this disclosure in general or use of the word "embodiment" in the singular is not intended to imply any limitation on the scope of the claims set forth below. Multiple embodiments may be set forth according to the limitations of the multiple claims issuing from this disclosure, and such claims accordingly define the embodiment(s) herein, and their equivalents, that are protected thereby.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A system for generating two-dimensional (2D) shaded contour renderings of three-dimensional (3D) models of physical objects, the system comprising:
   a processor; and
   a memory storing instructions that, when executed by the processor, cause the system to:
      receive a 3D model of a physical object;
      determine, at least a portion of the 3D model having at least one of a planar surface and a curved surface, including classifying two or more regions of the at least the portion of the 3D model including one or more: convex, concave, cylindrical, spherical, edge, planar, or curved;
      determine, based on the at least one of the planar surface and the curved surface, one or more surface shading and/or contour lines corresponding to the at least the portion of the 3D model;
      generate a 2D shaded contour rendering of the physical object, the 2D shaded contour rendering including the one or more surface shading and/or contour lines corresponding to the at least the portion of the 3D model, the one or more surface shading and/or contour lines configured to distinguish between adjacent planar surfaces in the two or more regions; and
      output the 2D shaded contour rendering for display, transmission or storage.

2. The system of claim 1, wherein determining the at least the portion of the 3D model comprises applying a convolutional neural network (CNN) trained for classifying the two or more regions.

3. The system of claim 2, wherein the CNN includes an encoder path, a decoder path, and/or one or more skip connections linking one or more layers of the encoder path and the decoder path.

4. The system of claim 2, wherein the CNN is trained to associate one or more features of the 3D models with a plurality of 2D shaded contour renderings in a training model.

5. The system of claim 2, further comprising a Graphic User Interface (GUI) operable to receive user feedback on the 2D shaded contour rendering.

6. The system of claim 5, wherein the instructions further cause the system to:
   receive, from the GUI, the user feedback;
   store, in the memory, the user feedback; and
   train the CNN based on the user feedback.

7. The system of claim 1, wherein the 2D shaded contour rendering is formatted in accordance with design patent illustration requirements.

8. The system of claim 1, wherein determining the one or more surface shading and/or contour lines comprises utilizing a generative adversarial network (GAN) trained on paired 3D to 2D datasets.

9. The system of claim 1, wherein the 2D shaded contour rendering is output in a file format including PDF, SVG, or TIFF.

10. A computer-implemented method for generating two-dimensional (2D) shaded contour renderings of three-dimensional (3D) models of physical objects, the method comprising:
    receiving, by a processor, a 3D model of a physical object;
    determining, by the processor, at least a portion of the 3D model having at least one of a planar surface and a curved surface, including classifying two or more regions of the at least the portion of the 3D model as convex, concave, cylindrical, spherical, edge, planar, or curved;
    determining, by the processor and based on the at least one of the planar surface and the curved surface, one or more surface shading and/or contour lines corresponding to the at least the portion of the 3D model;
    generating, by the processor, a 2D shaded contour rendering of the physical object, the 2D shaded contour rendering including the one or more surface shading and/or contour lines, the one or more surface shading and/or contour lines configured to distinguish between adjacent planar surfaces in the two or more regions; and
    outputting, by the processor, the 2D shaded contour rendering for display, transmission, or storage.

11. The method claim of 10, further comprising generating a feature-linking table (FLT) that maps feature data including one or more features of the 3D model to corresponding spatial coordinates within one or more 2D views of the 3D Model.

12. The method of claim 11, wherein the FLT is indexed to enable accelerating retrieval of the feature data during training or inference.

13. The method of claim 11, wherein an individual one of the one or more features mapped in the FLT includes a feature identifier, a three-dimensional coordinate, and/or a corresponding 2D coordinate for the one or more 2D views.

14. The method of claim 10, wherein generating the 2D shaded contour rendering comprises processing a first data stream of extracted feature vectors and a second data stream of depth data.

15. The method of claim 14, wherein outputs of a Convolutional Neural Network (CNN) and/or a Generative Advesarial Network (GAN) processing the first data stream and/or the second data stream are combined for the generating the 2D shaded contour rendering.

16. The method claim of 10, further comprising generating a depth map associated with the 3D model, the depth map including a matrix of depth values representing a depth of the two or more regions.

17. The method of claim 10, wherein generating, by the processor, the 2D shaded contour rendering of the physical object includes determining one or more edges between the adjacent planar surfaces.

18. A non-transitory computer-readable storage medium storing instructions that, when executed by one or more processors, cause the one or more processors to:

receive a three-dimensional (3D) model of a physical object;

determine at least a portion of the 3D model having at least one of a planar surface and a curved surface, including classifying two or more regions of the at least the portion of the 3D model as convex, concave, cylindrical, spherical, edge, planar, or curved;

determine, based on the at least one of the planar surface and the curved surface, one or more surface shading and/or contour lines corresponding to at least the portion of the 3D model;

generate a two-dimensional (2D) shaded contour rendering of the physical object, the 2D shaded contour rendering including the one or more surface shading and/or contour lines corresponding to the at least the portion of the 3D model, the one or more surface shading and/or contour lines configured to distinguish between adjacent planar surfaces in the two or more regions; and output the 2D shaded contour rendering for display, transmission, or storage.

19. The non-transitory computer-readable storage medium of claim 18, wherein the instructions further cause the system to receive user feedback via a graphical user interface and store the feedback for retraining a machine-learning model.

20. The non-transitory computer-readable storage medium of claim 18, wherein the one or more processors comprise a cloud-based rendering engine configured to process a plurality of 3D models in parallel.

* * * * *